331-98

SEARCH ROOM

Tr 1144

X 315 / 39

The invention resides in the particular feedback coupling loop "40"

June 22, 1954 A. V. HAEFF ET AL 2,681,997

FEEDBACK COUPLING MEANS

Filed Sept. 14, 1945 2 Sheets-Sheet 1

Feedback coupling conductor

Inventors
ANDREW V. HAEFF
THURE E. HANLEY

By Ralph L. Chappell
Attorney

June 22, 1954 A. V. HAEFF ET AL 2,681,997

FEEDBACK COUPLING MEANS

Filed Sept. 14, 1945 2 Sheets-Sheet 2

Inventors
ANDREW V. HAEFF
THURE E. HANLEY

By Ralph L Chappell

Attorney

Patented June 22, 1954 2,681,997

UNITED STATES PATENT OFFICE 2,681,997

FEEDBACK COUPLING MEANS

Andrew V. Haeff and Thure E. Hanley, Washington, D. C.

Application September 14, 1945, Serial No. 616,427

4 Claims. (Cl. 250—36)

Figure 1:
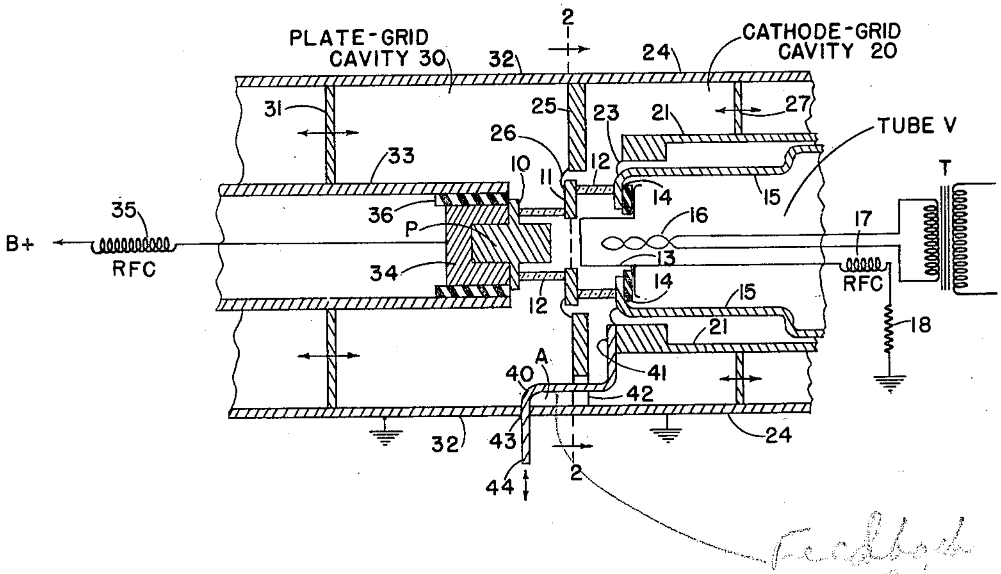

(Granted under Title 35, U. S. Code (1952), sec. 266)

This invention relates broadly to radio-frequency oscillators and, more particularly, to feedback coupling means for sustaining oscillations in radio-frequency vacuum tube oscillators of the so-called "grid-separation" type.

Radio-frequency oscillators of the "grid-separation" type are known in the art, particularly for generation of oscillations at ultra-high frequencies. Such prior oscillators commonly employ a triode vacuum tube (although a tetrode or other multi-grid tube may be used on occasion) in an oscillatory circuit wherein the tube's control grid is coupled to an intervening conducting partition or wall that operates to shield the plate and cathode tuned circuits from each other. In an oscillator of this type the control grid and the shielding partition normally are connected either directly to ground, or effectively grounded only for radio-frequency voltages by inserting a suitable by-pass capacitance in the circuit between grid and ground—the latter alternative permitting operation with the partition and/or grid at any desired direct-current potential. In order that such an oscillator may operate effectively at ultra-high frequencies, by minimizing the losses which might otherwise be encountered with conventional lumped circuit elements, the present tendency is to employ separately tunable plate-grid and cathode-grid resonating circuits comprising either resonant sections of transmission line or resonant cavities, coupled, in each case, as directly as possible to their respective electrodes in such a manner as to be mutually shielded by the grid partition as already described. The type of tube now widely known in the electronics field as the "lighthouse" tube (such as the type 446 or type 464 triode) is one example of a vacuum tube which lends itself admirably to the construction of such ultra-high-frequency oscillators employing cavity resonators, as will be made evident hereinafter in connection with the drawings and specification of the present invention.

In order for an oscillator of this class to function properly, a certain amount of feedback is required between the mutually-shielded plate and cathode tuned circuits, to replace the energy losses sustained therein. While for a certain range of ultra-high frequencies the interelectrode capacitances inherent in the tube itself may provide adequate feedback means, additional feedback must generally be provided if the tube is to oscillate at optimum efficiency or at lower frequencies. Considerable difficulty, however, has been experienced with ultra-high-frequency oscillators of this type in the past in providing sufficient additional feedback to sustain oscillations over a satisfactorily wide range of frequencies. This difficulty has been particularly apparent in such oscillators when, as is commonly the case, the cathode circuit presents a low-impedance path to the radio-frequency currents, whereas the impedance of the plate circuit thereto is quite high. In such cases, the feedback coupling to the low-impedance cathode circuit must be extremely tight in order to provide sufficient feedback voltage to enable oscillations to occur at the lower operating frequencies, whereas the feedback coupling to the plate circuit must be loose to avoid introducing any appreciable loading into the latter high-impedance circuit.

Accordingly, it is an object of this invention to provide feedback coupling means between the two mutually-shielded tuned resonant circuits of such an ultra-high-frequency oscillator that will be sufficient to sustain oscillations over a wide range of operating frequencies.

Another object of the invention is to provide, in any radio-frequency oscillator having two mutually-shielded tuned resonant circuits of which one presents a substantially low impedance at the operating frequency, feedback coupling means between the said low-impedance circuit and the other of said tuned circuits of such a character that the degree of feedback coupling to the tuned circuit last mentioned may be varied conveniently at will, within desired limits.

Features and advantages of the invention as applied to ultra-high-frequency oscillators of this type are the ease of initial adjustment of the feedback coupling so provided, and the fact that said oscillator may be sustained in stable oscillation when its resonant circuits are tuned during its normal operation over a wide range of ultra-high-frequencies, without need for further feedback coupling adjustment.

Although by no means limited thereto in its applicability, the invention is typified and most readily illustrated by certain preferred embodiments in ultra-high-frequency triode oscillators of the "grid-separation" type, wherein the separately-tunable plate-grid and cathode-grid resonators are mutually shielded by an intervening metallic partition coupled to the grid of the tube. As is normally the case, the shielding partition and one side of each resonator are effectively grounded for radio-frequency currents, while the cathode-grid resonator operates to present a substantially low impedance and the plate-grid resonator a substantially high impedance at each operating frequency. The invention shown therein resides in the use of one or more feedback coupling links, each comprising a continuous conductor in the form of an inductive metallic ribbon. One end of each such ribbon is tightly coupled to the low-impedance cathode-grid resonator by direct connection thereto at a point on the cathode side thereof effectively removed from ground potential. The other end is passed either over the shielding partition or through a small aperture therein, and effectively grounded in such a manner that a portion of said ribbon adjacent thereto provides a variably loose degree of inductive coupling to the magnetic field of the high-impedance plate-grid resonator by virtue of its adjustable spatial arrangement relative thereto.

Figure 2:
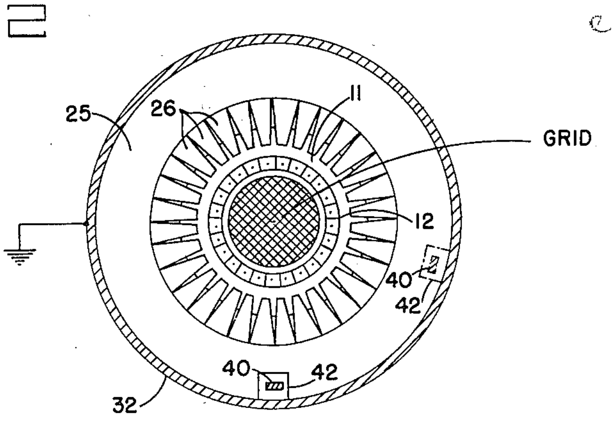
Figure 3:
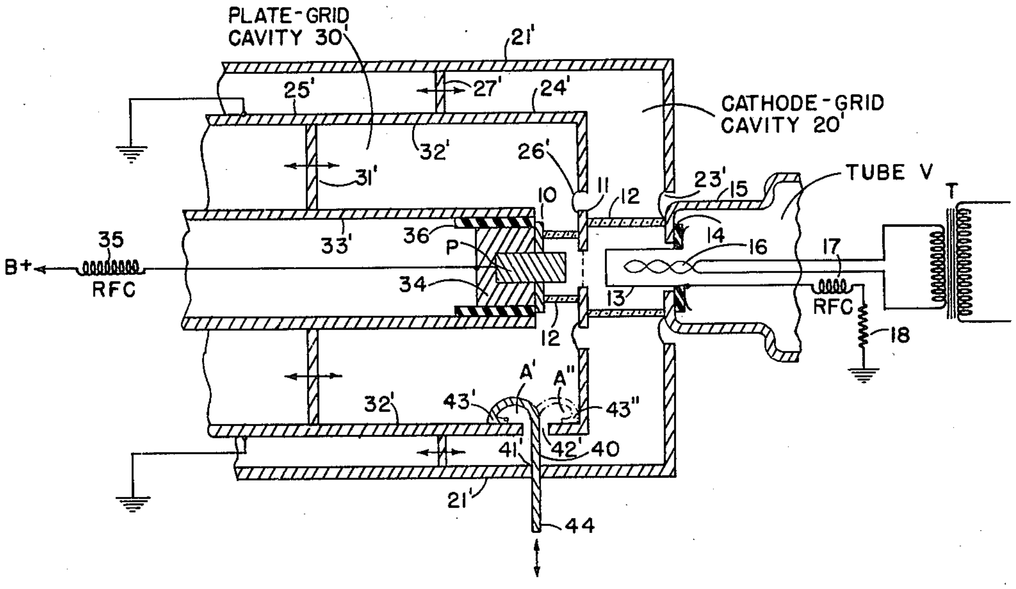
Figure 4:
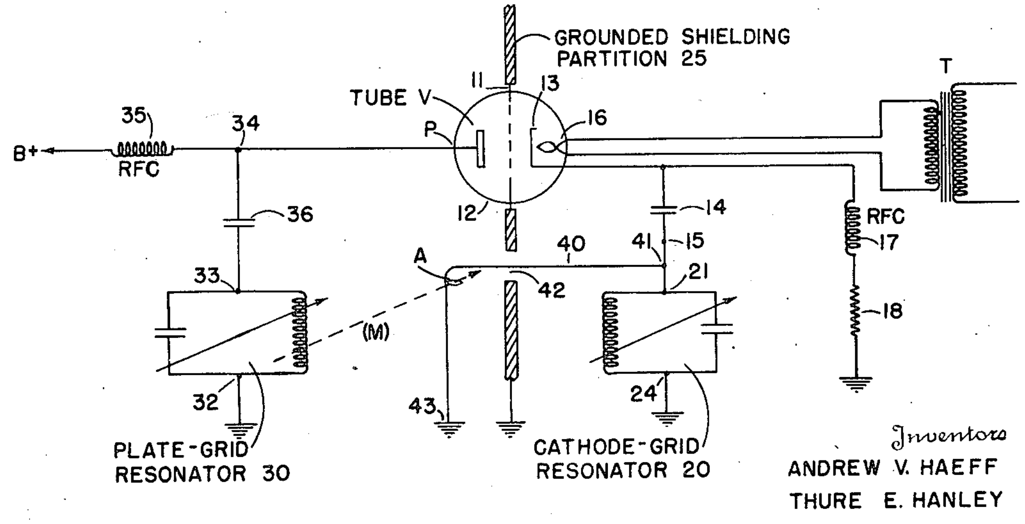

The foregoing, together with other objects, advantages, and features of the invention, will become apparent from a reading of the following description of certain preferred embodiments thereof when taken in conjunction with the accompanying drawings, wherein two "grid-separation" ultra-high-frequency oscillators embodying the invention and utilizing so-called "lighthouse" triode vacuum tubes are illustrated by way of example only, and in which:

Fig. 1 is a fragmentary view, partly in longitudinal section and partly schematic, of one preferred embodiment of the invention, incorporated in an ultra-high-frequency oscillator of which the high-impedance plate-grid and low-impedance cathode-grid resonators comprise tunable annular resonant cavities placed end to end in such fashion as to be mutually shielded by an intervening circular metal partition connected directly to the grid;

Fig. 2 represents a cross-sectional view of the oscillator illustrated in Fig. 1, taken substantially along the line 2—2 of Fig. 1, and with the corresponding parts thereof bearing the same reference numerals as in Fig. 1;

Fig. 3 is a fragmentary view, partly in longitudinal section and partly schematic, illustrating an embodiment of the invention in one of the alternative forms of such an ultra-high-frequency oscillator, in which the high-impedance plate-grid and low-impedance cathode-grid resonators comprise mutually-concentric resonant cavities having a common grounded wall connected directly to the grid; and Fig. 4 is a generalized schematic representation of the electrical circuit corresponding to that of both the Fig. 1 and Fig. 3 arrangements, in which the respective component parts bear approximately-corresponding reference numerals.

Referring now in detail to the drawings, V generally designates the oscillator vacuum tube, which is of the so-called "lighthouse" type. A further illustration and description of this type of tube may be found in the Science News Letter, dated August 19, 1944, page 115. As described therein, a "lighthouse" tube is a disc-seal electronic vacuum tube in which the anode (or plate) electrode connection 10 and grid connection 11 are sealed through the glass envelope 12 in the form of parallel metallic rings spaced axially from one another along the length of the tube. Connections to the plate are further facilitated by means of an axially-protruding metal plate cap P connected thereto. The cathode 13 is coupled, through a built-in by-pass capacitive layer 14 of mica or other suitable dielectric, to an outer metallic shell 15 as regards radio-frequency currents, but is insulated thereby from its shell 15 for direct (D. C.) currents. Although not shown in these drawings, the tube is provided with a suitable insulation base for the support of shell 15, and metallic prongs for cooperation with a tube socket by means of which appropriate external connections may be made to the cathode 13 and heater element 16, respectively. In this particular illustration, a radio-frequency choke 17 and resistance 18 are represented as connected in the external circuit from cathode 13 to ground, to block out stray radio-frequency currents and yet provide suitable D. C. operating bias. Heater filament voltage is represented as being obtained from the secondary of a filament transformer T.

The cathode-grid resonator in Fig. 1 is represented as an annular resonant cavity 20 of which the inner (or ungrounded) conducting wall 21 makes direct electrical contact with the metallic cathode shell 15 through an annular terminal arrangement of closely-spaced metallic contact fingers 23. These fingers 23 are basally attached to (as by soldering or the like), and protrude inwardly from, that end of the inner cavity wall 21 nearest the glass envelope 12, which end may be suitably widened adjacent thereto to present adequate surface contact area. The outer conducting wall 24 of cavity 20 is coupled directly to ground in this particular illustration, and is so constructed as to be firmly connected at its end nearest grid ring 11 (as by soldering, welding or the like) to the outer circumference of the circular metal shielding partition 25. The inner circumference of partition 25 is connected directly to the grid ring 11, by means of the angularly-arranged and closely-spaced metallic contact fingers 26 which are basally attached to and protruding from said partition. The resonant cavity 20 is tuned by means of a slidable annular metal plunger 27 located in that end of cavity 20 remote from grid partition 25, the edges of plunger 27 being at all times in direct electrical contact with the inner and outer conductors 21 and 24, respectively, of the resonant cavity 20.

The plate-grid resonator in Fig. 1 comprises the annular resonant cavity 30, similar to cavity 20 but longer and wider to increase its effective operating impedance, and similarly turned by means of a slidable metal plunger 31. That end of the grounded outer conducting wall 32 of cavity 30 remote from tuning plunger 31 also is represented as being connected directly to the outer circumference of shielding partition 25, so that in this particular illustration the outer conductors 32 and 24 effectively comprise adjacent portions of one continuous metal cylindrical wall. The inner (or ungrounded) conducting wall 33 of cavity 30 extends only to the immediate neighborhood of plate cap P, which is connected through its metal connector 34 and a suitable external radio-frequency choke 35 to the high-voltage D. C. source B+. The inner wall 33 is coupled to plate cap P for radio-frequency currents, but insulated from the high-voltage B+ plate supply, by means of the by-pass capacitive layer 36 of mica or other suitable dielectric surrounding the plate connector 34.

As illustrated in the drawings, the invention comprises an inductive coupling link 40 in the form of a short metallic ribbon, the relative thickness of which has been considerably exaggerated in these illustrations for purposes of clarity. In the particular example illustrated in Figs. 1 and 2, the fixed end 41 of this link 40 is coupled directly, as by soldering or other direct connecting connection of link 40 to the ungrounded conductor 21' of the cathode-grid cavity 20' is here illustrated as being effected through a slot 41' in said ungrounded conductor 21'. This slot 41' is constructed and functions similarly to slot 43 in Fig. 1, operating to terminate link 40 electrically at its point of passage therethrough, yet permitting a certain amount of variation in the size of the magnetic coupling area A' (or A'') by allowing the free end 44 of link 40 to be pushed in or pulled out at will within limits. Here again, two or more similarly connected feedback links 40 might be employed, laterally spaced from one another; and suitable external clamping means (not shown) also may be provided, adaptable to hold the free end(s) 44 of link(s) 40 fixed once initial adjustment of the feedback coupling has been completed.

The operation of the invention as already described will be evident on inspection of Fig. 4, which gives a generalized schematic representation of the electrical circuit of a typical "grid-separation" triode oscillator embodying the invention. Two particular embodiments of ultra-high-frequency oscillators employing this type of circuit have already been illustrated and described in connection with Figs. 1, 2 and 3, and their correspondence to the circuit of Fig. 4 is made clearly evident by the mutually consistent set of reference numbers employed to identify the various component elements of Fig. 4.

While this description of the invention has been confined largely to preferred embodiments thereof, it will be obvious to those skilled in the art that various changes and modifications may be made therein without departing from the spirit of the invention. In particular, it will be apparent that the invention is by no means limited in its practical application to ultra-high-frequency triode oscillators of the "grid-separation" type, but is adaptable broadly to any radio-frequency oscillator having two tuned resonant circuits between which feedback coupling is required in order to sustain oscillations. It is to be distinctly understood, therefore, that no limitations are intended other than are imposed by the scope of the appended claims as limited by the prior art.

The invention described herein may be manufactured and used by or for the Government of the United States of America for governmental purposes without the payment of any royalties thereon or therefor.

What is claimed is:

1. In a radio-frequency oscillator having two mutually-shielded resonators of which one presents a substantially low impedance at the operating frequency, each of said resonators having one side effectively at ground potential and another side effectively removed from ground potential for radio-frequency currents, the combination therewith of feedback coupling means comprising a continuous metallic conductor, one end of said conductor being tightly coupled to the said low-impedance resonator by direct connection to the said side thereof that is effectively removed from ground potential, the end of said conductor removed from the end first mentioned being connected directly to the said grounded side of the other of said resonators, a portion of said conductor adjacent the grounded end last mentioned being adjustably spaced relative to the said other resonator to provide a variable degree of substantially inductive coupling thereto, and the remainder of said conductor comprising a continuous conducting path operative to feed back to the said low-impedance resonator the radio-frequency energy thus inductively obtained from the said other resonator.

2. In a radio-frequency oscillator of the type having two tuned resonant circuits comprising resonant cavities so arranged as to have a common conducting wall operative to shield said cavities one from the other, each of said cavities having also a conducting wall effectively removed from ground potential for radio-frequency currents, and one of said cavities being operative to present a substantially low impedance at the frequency of oscillation, the combination therewith of at least one continuous metallic conductor, one end of said conductor being tightly coupled to the said low-impedance cavity by direct connection to the said wall thereof that is removed from ground potential, a portion of the said conductor remote from its end last mentioned being spatially arranged within the other of said cavities to provide inductive coupling to the magnetic field existing therein, and the remainder of said conductor comprising a continuous conducting path.

3. In a radio-frequency triode vacuum tube oscillator of the "grid-separation" type, wherein the resonating tuned circuits comprise two tunable resonators, one side of each of said resonators being coupled effectively to ground for radio-frequency currents and said resonators being mutually shielded by an intervening conducting partition coupled effectively to the control grid of said tube and to ground for radio-frequency currents, and in which one of said resonators operates to present a substantially low impedance at the frequency of oscillation, the combination therewith of feedback coupling means comprising at least one continuous metallic conductor, one end of said conductor being tightly coupled to the said low-impedance resonator by direct connection thereto at a point effectively removed from ground potential, the end of said conductor removed from its end first mentioned being directly connected to the said grounded side of the other of said resonators, a portion of the said conductor adjacent its grounded end last mentioned being adjustably spaced relative to the said other resonator to provide a variable degree of substantially inductive coupling thereto, and the remainder of said conductor comprising a continuous conducting path.

4. In a radio-frequency triode vacuum tube oscillator of the "grid-separation" type, wherein the plate-grid and cathode-grid resonant tuned circuits are mutually shielded by an intervening conducting partion coupled effectively to the control grid of said tube and to ground for radio-frequency currents, the combination therewith of feedback coupling means comprising at least one continuous metallic conductor, one end of said conductor being tightly coupled to the said cathode-grid resonant circuit by direct connection thereto at a point effective coupled to the cathode of said tube for radio-frequency currents, the end of said conductor remote from its end first mentioned being coupled effectively to ground for radio-frequency currents, a portion of said conductor being adjustably spaced relative to the said plate-grid resonant circuit to provide a variable degree of substantially inductive coupling thereto, and the remainder of said conductor comprising a continuous conducting path.

(References on following page)

means, to the end of inner conductor 21 of the low-impedance cathode-grid cavity 20 remote from the tuning plunger 27. The other end of link 40 is passed through a small aperture 42 in the shielding partition 25 and out through a slot 43 in the outer wall 32 of the high-impedance plate-grid cavity 30, in such a manner as to avoid electrical contact with partition 25 and to expose a relatively small effective coupling area A to the magnetic field existing in cavity 30. Slot 43 is so constructed as to make sufficiently firm electrical contact with link 40 to terminate it electrically at its point of passage therethrough. The purpose of slot 43 is to permit a certain amount of adjustment in the size of coupling area A, and hence in the degree of coupling M (as shown schematically in Fig. 4) to the magnetic field existing in plate-grid cavity 30, by allowing the external (or "free") end 44 to be pushed in or pulled out at will within certain limits. Suitable external clamping means (not shown) may be provided if desired, adaptable to maintain the amount of feedback coupling in proper fixed adjustment by holding fast the free end 44 of link 40 as soon as the desired adjustment has been attained.

It may be remarked that it is not necessary that there be only one such feedback link 40 in a given embodiment of the invention, and in fact it is frequently advantageous to use two or more such links, similarly arranged and connected, but spaced laterally from one another around the longitudinal axis of the oscillator. If only one link 40 is employed, the feedback voltage required to be induced therein may be of sufficient magnitude in certain practical applications to cause arc-overs between the link and the edges of aperture 42 adjacent its point of passage through the grounded partition 25. Furthermore, the link 40 itself might have a tendency to resonate if its effective electrical length happened to be exactly a half wavelength for the particular frequency of oscillation. Use of two or more such links 40 of slightly differing lengths would make it possible to distribute the load between them and thus avoid both difficulties. One way in which a second link 40 might be incorporated into the oscillator of Fig. 1 is illustrated by dotted lines in Fig. 2.

In one practical working model of an ultra-high-frequency oscillator embodying the invention, constructed substantially as illustrated and described in Figs. 1 and 2 and utilizing a type 464 "lighthouse" triode, a single feedback coupling link 40 was employed, comprising a phosphor-bronze ribbon aproximately .005 inch by $\frac{3}{16}$ inch in cross-section and one and one-half inches in length as measured between points 41 and 43 (so that the effective electrical length would be somewhat less than a half wave-length at the highest operating frequency). Actual experience with an ultra-high-frequency signal generator employing such an oscillator, in which the latter was operated with its cathode-grid resonator 20 in the $$\frac{\text{“}3\lambda\text{”}}{4}$$

mode and its plate-grid resonator 30 in the $$\frac{\text{“}5\lambda\text{”}}{4} \text{ or } \frac{\text{“}7\lambda\text{”}}{4}$$

modes, has indicated that reliably stable oscillations can easily be obtained throughout an operating frequency range of 2000–4000 megacycles per second without necessity for disturbing the initial setting of the feedback link 40, and that the lower frequency limit of stable oscillations can be extended downward as far as 600 megacycles per second merely by making the cathode-grid cavity 20 long enough. The one initial setting of the feedback coupling link 40 required is normally made most conveniently at the highest frequency of the particular band over which it is desired to operate.

For the sake of completeness, it should perhaps be pointed out in connection with Figs. 1 and 2 that in some ultra-high-frequency applications it is possible that such considerations as the transit time of the vacuum tube might require that the phasing or polarity of the feedback voltage be opposite to that obtainable from the particular embodiment of the invention illustrated therein. In such event, the fixed end 41 of the feedback link 40 would be coupled as already described to the inner conductor 21 of cavity 20, but the end 43 of link 40 would be led out through an aperture (not shown) in the outer wall 24 and in through a similar aperture (not shown) in the outer wall 32, and then looped back to connect to partition 25—thus effectively passing over, instead of through, the shielding partition 25 (which therefore would be left imperforate and devoid of any aperture 42). The apertures in the outer walls should be wide enough to prevent electrical contact with link 40. As in the case illustrated in Fig. 1, the degree of coupling M to plate-grid cavity 30 would depend on the size of the loop coupling area A exposed therein, which would in turn be controlled by pushing in or pulling out the link 40 through the aperture in outer wall 32. If the alternative arrangement just described were employed, it would be desirable to minimize radiation effects arising from that portion of link 40 exposed externally to both cavities 20 and 30 by providing a shielding compartment (not shown), externally attached to the outer walls 24 and 32 so as to enclose both of said apertures and that portion of link 40 between them.

Another of the many possible embodiments of the invention is illustrated in Fig. 3, wherein the high-impedance plate-grid and low-impedance cathode-grid resonators are represented as comprising mutually-concentric annular resonant cavities 30′ and 20′ respectively, having a common wall. This common wall serves simultaneously as the metal shielding partition 25′ and as the grounded conductors 32′ and 24′ of resonant cavities 30′ and 20′, respectively, being grounded at one end and connected at the other end directly to the grid ring 11 through the annularly-arranged metal contact fingers 26′. Except possibly for the invention itself, the various component parts of the ultra-high-frequency oscillator here illustrated are so precisely analogous in character and function to those already described in detail in connection with Fig. 1 that it is believed satisfactory to state here merely that they have been identified with a mutually consistent set of reference numbers such as to indicate clearly their respective correspondence to those illustrated in Fig. 1.

In the oscillator of Fig. 3, the invention again is illustrated as comprising an inductive metallic feedback coupling link 40, but here its end 43′ (or 43″ if the alternative phasing arrangement shown in dotted lines is employed) attached to the outer (or grounded) conductor 32′ of the plate-grid cavity 30′ is fixed, whereas the direct

References Cited in the file of this patent

UNITED STATES PATENTS

| Number | Name | Date |
| --- | --- | --- |
| 2,204,179 | George | June 11, 1940 |
| 2,245,645 | Brown | June 17, 1941 |
| 2,281,550 | Barrow | May 5, 1942 |
| 2,284,405 | McArthur | May 26, 1942 |
| 2,287,845 | Varian et al. | June 30, 1942 |
| 2,304,186 | Litton | Dec. 8, 1942 |

| Number | Name | Date |
| --- | --- | --- |
| 2,312,919 | Litton | Mar. 2, 1943 |
| 2,362,209 | Litton | Nov. 7, 1944 |
| 2,416,565 | Beggs | Feb. 25, 1947 |
| 2,421,784 | Haeseler | June 10, 1947 |
| 2,446,017 | McArthur | July 27, 1948 |
| 2,456,579 | Burnside | Dec. 14, 1948 |
| 2,462,866 | Hotine | Mar. 1, 1949 |
| 2,477,232 | Branson | July 26, 1949 |
| 2,501,534 | Nergaard | Mar. 21, 1950 |